(12) United States Patent
Endo et al.

(10) Patent No.: US 9,568,001 B2
(45) Date of Patent: Feb. 14, 2017

(54) OIL-COOLED SCREW COMPRESSOR SYSTEM AND OIL-COOLED SCREW COMPRESSOR

(75) Inventors: Yasuaki Endo, Tokyo (JP); Fumihiko Kaneko, Tokyo (JP); Hironori Yamashita, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 14/428,099

(22) PCT Filed: Sep. 14, 2012

(86) PCT No.: PCT/JP2012/073622
§ 371 (c)(1),
(2), (4) Date: Mar. 13, 2015

(87) PCT Pub. No.: WO2014/041680
PCT Pub. Date: Mar. 20, 2014

(65) Prior Publication Data
US 2015/0260187 A1 Sep. 17, 2015

(51) Int. Cl.
*F04C 27/00* (2006.01)
*F04C 29/02* (2006.01)
(Continued)

(52) U.S. Cl.
CPC ............. *F04C 27/009* (2013.01); *F04C 18/16* (2013.01); *F04C 29/021* (2013.01); *F04C 29/026* (2013.01);
(Continued)

(58) Field of Classification Search
CPC ......... F16J 15/002; F16J 15/164; F04C 18/16; F04C 27/009; F04C 29/021; F04C 29/026
(Continued)

(56) References Cited

U.S. PATENT DOCUMENTS 3,975,123 A 8/1976 Schibbye
4,394,113 A * 7/1983 Bammert ............... F04C 29/02
418/201.2
(Continued)

FOREIGN PATENT DOCUMENTS

EP 0859154 A1 8/1998
EP 2306027 A1 4/2011
(Continued)

OTHER PUBLICATIONS

International Preliminary Report on Patentability, dated Mar. 26, 2015, issued in PCT/JP2012/073622. English translation provided.
(Continued)

*Primary Examiner* — Mary A Davis
*Assistant Examiner* — Anthony Ayala Delgado
(74) *Attorney, Agent, or Firm* — Rossi, Kimms & McDowell LLP

(57) ABSTRACT

In a housing 20 of an oil-cooled screw compressor 10, a separation gas supply path 59 through which separation gas is supplied to a separation gas supply gap 58 defined between a first seal unit and a second seal unit of a seal device 50, and a pressure balancing path 60 through which an area closer to a screw chamber 20a than the first seal unit in a discharge side seal chamber 20d communicates with a compression chamber at a pressure higher than an intake pressure and lower than a discharge pressure, are defined. A check valve 62 that restricts a flow of a fluid in a direction from the screw chamber 20a to the discharge side seal chamber 20d is disposed in the pressure balancing path 60.

13 Claims, 10 Drawing Sheets

(51) Int. Cl.
  *F04C 18/16* (2006.01)
  *F16J 15/00* (2006.01)
  *F16J 15/16* (2006.01)
  *F04C 29/12* (2006.01)

(52) U.S. Cl.
  CPC .............. *F04C 29/12* (2013.01); *F16J 15/002* (2013.01); *F16J 15/164* (2013.01)

(58) Field of Classification Search
  USPC ....... 418/88, 97, 98, 99, 206.6, 206.7, 206.8
  See application file for complete search history.

(56) References Cited

U.S. PATENT DOCUMENTS

| | | | |
|---|---|---|---|
| 5,228,298 A | | 7/1993 | Kun et al. |
| 5,727,936 A | * 3/1998 | Eriksson | F04C 29/02 184/6.16 |
| 6,095,780 A | * 8/2000 | Ernens | F04C 27/009 277/351 |
| 6,302,667 B1 | * 10/2001 | Timuska | F04C 29/0021 184/6.16 |
| 8,465,269 B2 | * 6/2013 | Cacard | F04C 27/009 384/480 |
| 2011/0076174 A1 | | 3/2011 | Kakiuchi et al. |
| 2011/0135528 A1 | | 6/2011 | Amano |
| 2012/0164015 A1 | | 6/2012 | Yoshimura et al. |

FOREIGN PATENT DOCUMENTS

| | | |
|---|---|---|
| EP | 2314874 A1 | 4/2011 |
| JP | 10501862 A | 2/1998 |
| JP | 4365443 B1 | 11/2009 |
| JP | 4431184 B2 | 3/2010 |
| JP | 2012149631 A | 8/2012 |
| WO | 9535446 A1 | 12/1995 |

OTHER PUBLICATIONS

International Search Report issued in PCT/JP2012/073622, mailed Dec. 18, 2012. English translation provided.

Extended European Search Report issued in European Appln. No. 12884596.3 mailed Jul. 19, 2016.

\* cited by examiner

Fig.8
(a) 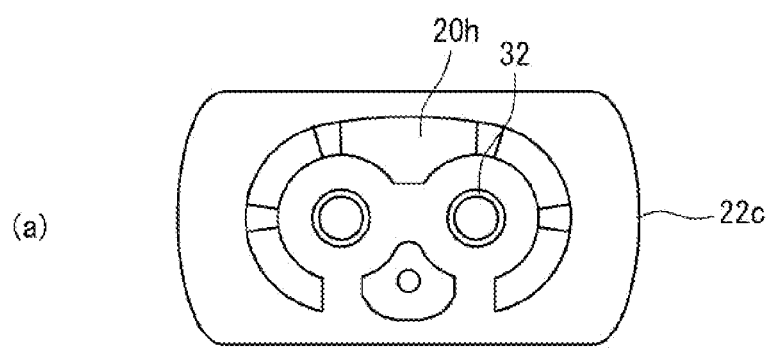
(b) 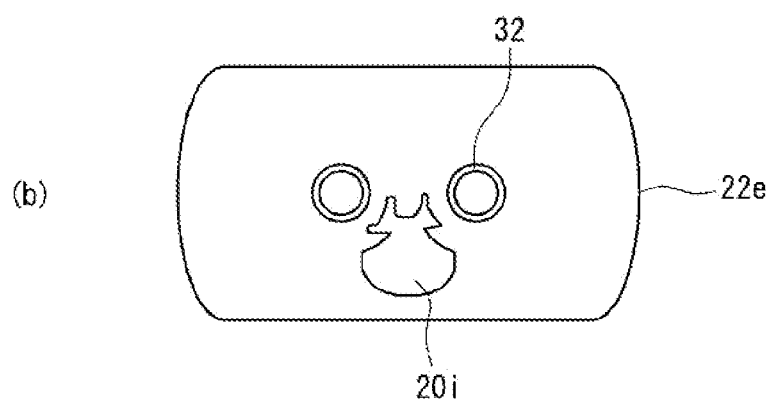

OIL-COOLED SCREW COMPRESSOR SYSTEM AND OIL-COOLED SCREW COMPRESSOR

TECHNICAL FIELD

This invention relates to an oil-cooled screw compressor system and an oil-cooled screw compressor.

BACKGROUND

Oil-cooled screw compressors, configured to supply oil to a compressor main body for the purpose of lubrication, cooling, and shaft sealing, are installed in factories for manufacturing industrial products, chemical plants, oil refining plants, or the like to compress various types of gas.

For example, an oil-cooled screw compressor, disclosed in Patent Document 1, includes a housing in which a screw chamber, seal chambers positioned on both sides of the screw chamber, and bearing chambers connected to the screw chamber via the seal chambers, are defined.

A pair of male and female screw rotors are accommodated in the housing while being in parallel with each other. The screw rotors each include a screw and shafts which coaxially extend from both ends of the screw. The pair of screws are disposed in the screw chamber while meshing each other, and form a compression chamber for compressing target gas.

In the housing, an intake port through which gas is drawn in from the outside and an intake path through which the intake port communicates with the compression chamber are formed. In the housing, a discharge port through which compressed gas is discharged to the outside and a discharge path through which the discharge port communicates with the compression chamber are formed.

The intake path is provided to communicate with the compression chamber through one end side (intake side) of the compression chamber. The discharge path is provided to communicate with the compression chamber through the other end side (discharge side) of the compression chamber.

The shaft of the screw rotor is disposed in the seal chamber and the bearing chamber, and is rotatably supported by a radial bearing, e.g., a slide bearing, disposed in the bearing chamber. The shaft of the male screw rotor is coupled to an output shaft of a power source, or a motor, disposed outside. The male screw rotor rotates upon receiving rotational force from the power source.

The female screw rotor rotates in synchronization with the rotation of the male screw rotor. A series of processing including: a step of drawing gas into the compression chamber through the intake path; a step of compressing the gas by reducing the capacity of the compression chamber; and a step of discharging the gas from the compression chamber to the discharge path, is repeated along with the rotation of the male and the female screw rotors.

A bearing lubricating fluid is supplied to the bearing of the oil-cooled screw compressor. Thus, a supply port and a discharge port for the bearing lubricating fluid, as well as a flow path for the bearing lubricating fluid through which the supply port and the discharge port communicate with the bearing chamber, are formed in the housing.

A tooth surface lubricating fluid is supplied to the screw. Thus, a supply port for the tooth surface lubricating fluid and a flow path for the tooth surface lubricating fluid through which the supply port communicates with the screw chamber, are formed in the housing.

In first to third embodiments of Patent Document 1, systems for respectively supplying the bearing lubricating fluid and the tooth surface lubricating fluid to an oil-supplying screw compressor are separately provided. In the seal chamber of the screw compressor, a mechanical seal as a shaft sealing member is disposed to surround the shaft. The bearing lubricating fluid is supplied to the mechanical seal. The mechanical seal, supported by the bearing lubricating fluid, seals a portion between the bearing chamber and the screw chamber.

Thus, in the first to the third embodiments of Patent Document 1, the bearing lubricating fluid and the tooth surface lubricating fluid are isolated from each other by the shaft sealing member. It is described in Patent Document 1 that, with this configuration, even when the target gas is corrosive gas, the bearing lubricating fluid is almost completely prevented from coming into contact with the target gas, whereby degradation of the bearing lubricating fluid by the target gas is prevented, and thus, the bearing lifespan can be prevented from being shortened. It is further described that, by using the bearing lubricating fluid as a seal fluid, the target gas can surely be prevented from flowing into the bearing chamber.

In a fourth embodiment of Patent Document 1, a shaft sealing member, formed of a plurality of carbon ring seals, connects between the screw chamber and the bearing chamber of the oil-supplying screw compressor through a plurality of tiny gaps. The target gas discharged from the screw compressor is partially supplied to a gas transfer chamber at an intermediate portion of the shaft sealing member. It is described in Patent Document 1 that, with this configuration, the amount of the target gas flowing into the bearing chamber through the shaft sealing member is extremely small, whereby the bearing lubricating fluid is not degraded and the direct corrosion of the bearing is prevented.

In Patent Document 2, an oil-free screw compressor in which no tooth surface lubricating fluid is supplied to a screw is disclosed as a third embodiment. In the seal chamber of the oil-free screw compressor, a shaft sealing member including a plurality of carbon ring seals and a labyrinth seal are disposed. Inert gas is supplied to a gas transfer chamber at an intermediate portion of the shaft sealing member instead of process gas at a discharge pressure. The seal chamber on the discharge side communicates with the intake port through an inlet return line. The intake port communicates with an upper portion of an oil supply tank which stores the bearing lubricating fluid, through a supply process gas communication line.

It is described in Patent Document 2 that, with this configuration, even when target gas including a corrosive element is to be compressed, the target gas can be prevented from coming into contact with the bearing, whereby an attempt to prevent the lubricant oil from degrading is facilitated.

CITATION LIST

Patent Literature

Patent Document 1: Japanese Patent No. 4431184
Patent Document 2: Japanese Patent No. 4365443

SUMMARY

Technical Problem

In the oil-supplied screw compressors of the first to the third embodiments in Patent Document 1, the target gas supplied to the screw chamber is in contact with the mechanical seal, and thus the target gas might be mixed into the bearing lubricating fluid. Thus, when the target gas includes a corrosive element, the corrosive element might be mixed into the bearing lubricating fluid to reach the bearing to cause corrosion of the bearing.

In the screw compressor of the fourth embodiment of Patent Document 1, the high pressure target gas is supplied to the shaft sealing member on the discharge side including a plurality of carbon ring seals. The supplied target gas flows into the bearing chamber on the discharge side to reach the bearing. Thus, when the target gas includes the corrosive element, the bearing on the discharge side might be corroded. The target gas supplied to the shaft sealing member on the intake side including the plurality of carbon ring seal is depressurized by an orifice. Still, the target gas flows into the bearing chamber on the intake side and reaches the intake side and thus, when the target gas includes the corrosive element, the bearing on the intake side might be corroded.

In the oil-free screw compressor of the third embodiment of Patent Document 2, the inert gas is supplied to the gas transfer chamber at the intermediate portion of the shaft sealing member instead of the high pressure target gas discharged from the oil-free screw compressor. The pressure of the inert gas supplied to the gas transfer chamber is high. The intake port communicates with the upper portion of the oil supply tank through the supply process gas communication line. Thus, the pressure of the oil supplied to the bearing from the oil supply tank is a result of incrementing the intake pressure by the amount of pressure raised by the oil supply pump.

Thus, in the oil-free screw compressor of the third embodiment of Patent Document 2, there is a large pressure difference between the inert gas supplied to the shaft sealing member and the bearing lubricating fluid supplied to the bearing. As a result, a large amount of inert gas leaks out from the shaft sealing member, and thus a large amount of inert gas is used. As a result, the screw compressor is operated at a high cost.

Furthermore, in this configuration, the high pressure inert gas flows into the intake port through the inlet return line. Thus, there is a problem that a large amount of power is consumed in the screw compressor because the high pressure inert gas is drawn into the screw compressor through the intake port, and thus the operation cost is high.

In the screw compressor of the fourth embodiment of Patent Document 1, the tiny gaps to the rotor shaft are formed by the carbon rings as the bearing member. Thus, when the target gas is no longer supplied to the bearing member after the screw compressor is stopped, the bearing lubricating fluid flows into the screw chamber from the bearing chamber through the gaps.

When the bearing lubricating fluid flows into the screw chamber in a case where the bearing lubricating fluid and the tooth surface lubricating fluid are separately provided, the amount of bearing lubricating fluid held in the bearing lubricating fluid supply system is reduced. Thus, the bearing lubricating fluid needs to be additionally provided, and the screw compressor is operated at a high cost. When the bearing lubricating fluid flows into the screw chamber, the amount of fluid held in the tooth surface lubricating fluid supply system increases. Thus, the amount of the fluid held in the tooth surface lubricating fluid supply system needs to be adjusted. As a result, the screw compressor is operated at a high cost also in this case.

In the oil-free screw compressor of Patent Document 2, the male and the female screw rotors are synchronously rotated by a pair of timing gears coupled to the shafts of the male and the female screw rotors, and not by the meshing between the screws as in the oil-cooled screw compressor. In the oil-free screw compressor, a non-contact state where a gap is provided in the meshing portion between the screws is achieved. Thus, the compression efficiency is lower than that in the oil-cooled screw compressor, and a high rotation-high speed motor is required as the power source.

In this regard, an object of this invention is to provide an oil-cooled screw compressor system which can operate an oil-cooled screw compressor at a low cost while surely preventing degradation of a bearing even when target gas includes a corrosive element, and the oil-cooled screw compressor used in the system.

Solution to Problem

In order to achieve the object described above, at least one embodiment of this invention provides an oil-cooled screw compressor system including: an oil-cooled screw compressor; a tooth surface lubricating fluid supply system which supplies a tooth surface lubricating fluid to the oil-cooled screw compressor; a bearing lubricating fluid supply system which supplies a bearing lubricating fluid to the oil-cooled screw compressor, in addition to the tooth surface lubricating fluid; and a separation gas supply system which supplies separation gas different from target gas compressed by the oil-cooled screw compressor to the oil-cooled screw compressor. The oil-cooled screw compressor includes: a housing in which a screw chamber, seal chambers positioned on both sides of the screw chamber, bearing chambers which communicates with the screw chamber via the seal chambers, a tooth surface lubricating fluid flow path through which the tooth surface lubricating fluid is supplied to the screw chamber, and a bearing lubricating fluid flow path through which the bearing lubricating fluid is supplied to the bearing chambers, are defined; male and female screw rotors each including: a screw which is disposed in the screw chamber and forms a compression chamber; and shafts which coaxially extend from both ends of the screw to be disposed in the seal chambers and the bearing chambers; a plurality of bearings which are disposed in the bearing chambers, and rotatably support the respective shafts; and seal devices which are disposed in the respective seal chambers, and each seal a circumference of a corresponding one of the shafts. The seal devices each include: a first seal unit which is disposed on a side of the screw chamber in the corresponding seal chamber; and a second seal unit which is disposed on a side of the bearing unit in the seal chamber, the second seal unit and the first seal unit defining a separation gas supply gap therebetween. The seal chambers include: a discharge side seal chamber which is positioned on a discharge side of the compression chamber; and an intake side seal chamber which is positioned on an intake side of the compression chamber. In the housing, a separation gas supply path through which the separation gas is supplied into the separation gas supply gap, and a pressure balancing path through which an area closer to the screw chamber than the first seal unit in the discharge side seal chamber communicates with the compression chamber at a pressure higher than an intake pressure of the target gas drawn into the oil-cooled screw compressor and lower than a discharge pressure of the target gas discharged from the oil-cooled screw compressor, are defined in addition to the tooth surface lubricating fluid flow path and the bearing lubricating fluid flow path. A check valve which restricts a flow of a fluid in a direction from the screw chamber to the discharge side seal chamber is disposed in the pressure balancing path.

In the oil-cooled screw compressor system of the at least one embodiment, the separation gas supply gap is defined between the first seal unit and the second seal unit of the seal device. When the oil-cooled screw compressor is under operation, the separation gas is supplied to the separation gas supply gap. The separation gas thus supplied leaks out to the screw chamber through the first seal unit. Thus, when the screw compressor is under operation, the first seal unit prevents the target gas from flowing into the bearing chambers, thereby preventing the target gas from coming into contact with the bearing lubricating fluid. Thus, the degradation of the bearing can be surely prevented, even when the target gas includes a corrosive element.

In this configuration, even when the high pressure target gas from the compression chamber flows into the discharge side seal chamber, the target gas thus flowed in is returned to the compression chamber through the pressure balancing path. Thus, the pressure of the target gas in the area, in the discharge side seal chamber, closer to the screw chamber than the first seal unit, is reduced. All things considered, the target gas is surely prevented from passing through the first seal unit to leak out.

In this configuration, the target gas is returned to the compression chamber through the pressure balancing path. Thus, the first seal unit prevents the target gas and the tooth surface lubricating fluid from passing through in the directions from the screw chamber to the bearing chambers, without raising the supply pressure of the separation gas supplied to the discharge side seal chamber over the discharge pressure of the target gas discharged from the oil-cooled screw compressor. Thus, the supply pressure of the separation gas can be set to be lower than the discharge pressure, whereby a less amount of separation gas is consumed.

In this configuration, the target gas which has flowed into the discharge side seal chamber is returned to the compression chamber in a state of having a higher pressure than the intake pressure, through the pressure balancing path. Thus, the degradation of the efficiency of the oil-cooled screw compressor is prevented. As a result, the screw compressor is operated at a low cost.

In the oil-cooled screw compressor system of the one embodiment, the housing includes: a screw casing which defines the screw chamber; seal casings which are detachably coupled to the screw casing and define the respective seal chambers and the pressure balancing path; and bearing casings which are detachably coupled to the screw casing via the respective seal casings, and define the respective bearing chambers.

In this configuration, the seal casings are detachably coupled to the screw casing and the bearing casings are detachably coupled to the screw casing via the seal casings. Because the housing is thus formed of a plurality of separable casings, the oil cooled screw compressor and the oil-cooled screw compressor which compresses the target gas including no corrosive element can share the screw casing as well as the bearing casings. Thus, the components of the oil-cooled screw compressor are highly versatile, and the cost of the oil-cooled screw compressor system can be reduced.

In the oil-cooled screw compressor system of the one embodiment, the first seal unit includes a first labyrinth seal, the second seal unit includes a second labyrinth seal, a first lip seal, and a second lip seal which are arranged in this order from the separation gas supply gap to the bearing chamber, the first lip seal restricts a flow of a fluid in a direction from the screw chamber to the bearing chambers, and the second lip seal restricts a flow of a fluid in a direction from the bearing chambers to the screw chamber.

In this configuration, the first lip seal restricts a flow of a fluid in directions from the screw chamber to the bearing chambers. Thus, even when the separation gas is not supplied when the oil-cooled screw compressor is stopped, the target gas is prevented from flowing into the bearing chambers, and thus the corrosion of the bearings is prevented.

Furthermore, the second lip seal restricts a flow of a fluid in directions from the bearing chambers to the screw chamber. Thus, even when the separation gas is not supplied when the oil-cooled screw compressor is stopped, the bearing lubricating fluid is prevented from flowing into the screw chamber, whereby the reduction of the bearing lubricating fluid is suppressed, and thus the oil-cooled screw compressor can be operated at a low cost.

The oil-cooled screw compressor system of the one embodiment further includes a control system which controls a supply pressure for the separation gas supplied to the oil-cooled screw compressor. The control system controls the supply pressure for the separation gas in such a manner that the supply pressure for the separation gas supplied to the oil-cooled screw compressor becomes higher than the intake pressure and lower than the discharge pressure.

In this configuration, the control is performed in such a manner that the supply pressure of the separation gas becomes higher than the intake pressure and lower than the discharge pressure. Thus, the consumption amount of the separation gas is small, and the oil-cooled screw compressor can be operated at a low cost.

In the oil-cooled screw compressor system of the one embodiment, the control system controls a supply pressure for the bearing lubricating fluid in such a manner that a return pressure of the bearing lubricating fluid flowing out from the oil-cooled screw compressor becomes equal to or higher than the intake pressure and lower than the supply pressure for the separation gas.

In this configuration, the control is performed in such a manner that the return pressure of the bearing lubricating fluid becomes equal to or higher than the intake pressure and lower than the supply pressure for the separation gas. Thus, the pressure difference between the separation gas supply gap and the bearing chamber is kept small. Thus, the fluid is prevented from flowing from the bearing chambers to the screw chamber with a small amount of consumed separation gas. Thus, the oil-cooled screw compressor can be operated at a low cost.

In the oil-cooled screw compressor system of the one embodiment, the bearing lubricating fluid supply system includes a storage tank which stores the bearing lubricating fluid at a storage pressure higher than the intake pressure. Gas of a same type as the separation gas is used as pressurization gas with which a pressure in the storage tank rises up to the storage pressure.

In this configuration, the gas of the same type as the separation gas is used as the pressurization gas with which a pressure in the storage tank rises up to the storage pressure. Thus, the supply pressure of the bearing lubricating fluid can be raised up to or over the intake pressure with a simple configuration.

In the oil-cooled screw compressor system of the one embodiment, the control system includes: an intake pressure sensor which detects the intake pressure; a control valve which is able to adjust the supply pressure for the separation gas; and a control device which operates the control valve in accordance with a detection result of the intake pressure sensor.

In this configuration, the supply pressure of the separation gas can be accurately controlled with a simple configuration.

In the oil-cooled screw compressor system of the one embodiment, the oil-cooled screw compressor further includes a capacity control device. The tooth surface lubricating fluid supply system supplies a working fluid to the capacity control device, the working fluid being part of the tooth surface lubricating fluid.

In this configuration, the tooth surface lubricating fluid is used as the working fluid for the capacity control device. Thus, the target gas is prevented from being mixed into the bearing lubricating fluid in the capacity control device. Thus, the corrosion of the bearing can surely be prevented.

In order to achieve the object described above, at least one embodiment of this invention provides an oil-cooled screw compressor including: a housing in which a screw chamber, seal chambers positioned on both sides of the screw chamber, bearing chambers which communicates with the screw chamber via the seal chambers, a tooth surface lubricating fluid flow path through which a tooth surface lubricating fluid is supplied to the screw chamber, and a bearing lubricating fluid flow path through which a bearing lubricating fluid is supplied to the bearing chambers in addition to the tooth surface lubricating fluid flow path, are defined; male and female screw rotors each including: a screw which is disposed in the screw chamber; and shafts which coaxially extend from both ends of the screw to be disposed in the seal chambers and the bearing chambers; a plurality of bearings which are disposed in the bearing chambers, and rotatably support the respective shafts; and seal devices which are disposed in the respective seal chambers, and each seal a circumference of a corresponding one of the shafts. The seal devices each include: a first seal unit which is disposed on a side of the screw chamber in the seal chamber; and a second seal unit which is disposed on a side of the bearing unit in the seal chamber, the second seal unit and the first seal unit defining a separation gas supply gap therebetween. The seal chambers includes: a discharge side seal chamber which is positioned on a discharge side of the compression chamber; and an intake side seal chamber which is positioned on an intake side of the compression chamber. In the housing, a separation gas supply path through which the separation gas is supplied into the separation gas supply gap, and a pressure balancing path through which an area closer to the screw chamber than the first seal unit in the discharge side seal chamber communicates with the compression chamber at a pressure higher than an intake pressure of the target gas drawn into the oil-cooled screw compressor and lower than a discharge pressure of the target gas discharged from the oil-cooled screw compressor, are defined in addition to the tooth surface lubricating fluid flow path and the bearing lubricating fluid flow path. A check valve which restricts a flow of a fluid in a direction from the screw chamber to the discharge side seal chamber is disposed in the pressure balancing path.

In the oil-cooled screw compressor of the at least one embodiment, the separation gas supply gap is defined between the first seal unit and the second seal unit of the seal device. When the oil-cooled screw compressor is under operation, the separation gas is supplied to the separation gas supply gap. The separation gas thus supplied leaks out to the screw chamber through the first seal unit. Thus, when the screw compressor is under operation, the first seal unit prevents the target gas from flowing into the intake side bearing chamber and the discharge side bearing chamber, thereby preventing the target gas from coming into contact with the bearing lubricating fluid.

In this configuration, even when the high pressure target gas from the compression chamber flows into the discharge side seal chamber, the target gas thus flowed in is returned to the compression chamber through the pressure balancing path. Thus, the pressure of the target gas in the area, in the discharge side seal chamber, closer to the screw chamber than the first seal unit, is reduced. All things considered, the target gas is surely prevented from passing through the first seal unit to leak out.

In this configuration, the target gas is returned to the compression chamber through the pressure balancing path. Thus, the first seal unit prevents the target gas and the tooth surface lubricating fluid from passing through in the direction from the screw chamber to the intake side bearing chamber and the discharge side bearing chamber, without raising the supply pressure of the separation gas supplied to the discharge side seal chamber over the discharge pressure of the target gas discharged from the screw compressor. Thus, the supply pressure of the separation gas can be set to be lower than the discharge pressure, whereby a less amount of separation gas is consumed.

In this configuration, the target gas which has flowed into the discharge side seal chamber is returned to the compression chamber in a state of having a higher pressure than the intake pressure, through the pressure balancing path. Thus, the degradation of the efficiency of the oil-cooled screw compressor is prevented. As a result, the oil-cooled screw compressor is operated at a low cost.

In the oil-cooled screw compressor of the one embodiment, the housing includes: a screw casing which defines the screw chamber; seal casings which are detachably coupled to the screw casing and define the respective seal chambers and the pressure balancing path; and bearing casings which are detachably coupled to the screw casing via the respective seal casings, and define the bearing chambers.

In this configuration, the seal casings are detachably coupled to the screw casing and the bearing casings are detachably coupled to the screw casing via the seal casings. Thus, the screw casing and the bearing casings which are the same as those used in the conventional oil-cooled screw compressor can be used. Thus, the components of the oil-cooled screw compressor are highly versatile, and the cost of the oil-cooled screw compressor can be reduced.

In the oil-cooled screw compressor of the one embodiment, the first seal unit includes a first labyrinth seal, the second seal unit includes a second labyrinth seal, a first lip seal, and a second lip seal which are arranged in this order from the separation gas supply gap to the bearing chambers. The first lip seal restricts a flow of a fluid in a direction from the screw chamber to the bearing chambers. The second lip seal restricts a flow of a fluid in a direction from the bearing chambers to the screw chamber.

In this configuration, the first lip seal restricts a flow of a fluid in directions from the screw chamber to the bearing chambers. Thus, even when the separation gas is not supplied when the oil-cooled screw compressor is stopped, the target gas is prevented from flowing into the bearing chambers, and thus the corrosion of the bearings is prevented.

Furthermore, the second lip seal restricts a flow of a fluid in directions from the bearing chambers to the screw chamber. Thus, even when the separation gas is not supplied when the oil-cooled screw compressor is stopped, the bearing lubricating fluid is prevented from flowing into the screw chamber, whereby the reduction of the bearing lubricating fluid is suppressed, and thus the oil-cooled screw compressor can be operated at a low cost.

Advantageous Effects

According to at least one embodiment of the present invention, an oil-cooled screw compressor system which can operate an oil-cooled screw compressor at a low cost while surely preventing degradation of a bearing even when target gas includes a corrosive element, and the oil-cooled screw compressor used in the system are prevented.

BRIEF DESCRIPTION OF DRAWINGS

FIG. 8(a) is a diagram showing a schematic end surface of the intake side bearing casing taken along the line VIIIa-VIIIa in FIG. 7, and FIG. 8(b) is a diagram showing a schematic end surface of the discharge side bearing casing taken along the line VIIIb-VIIIb.

DETAILED DESCRIPTION

Embodiments of this invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
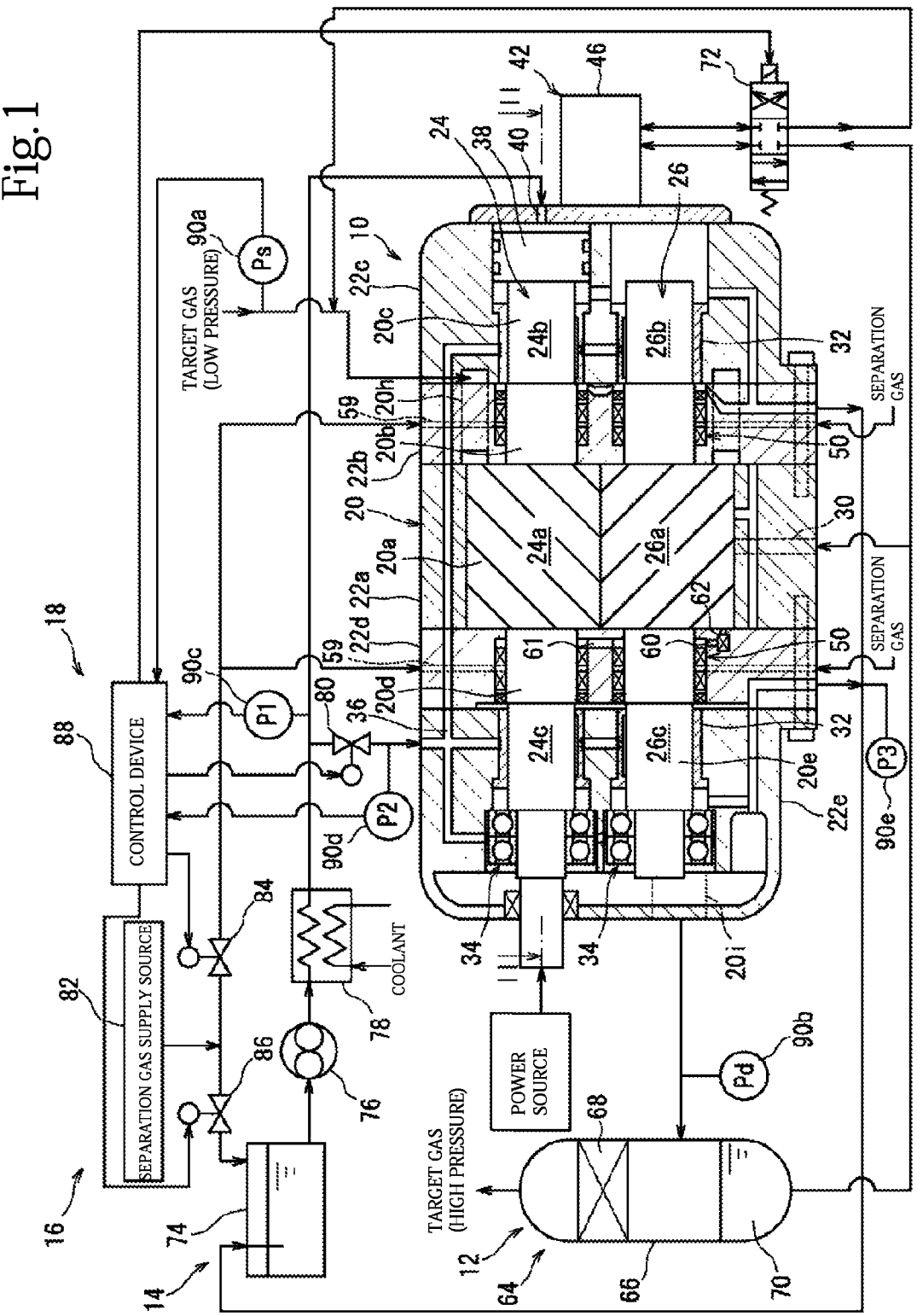
FIG. 1 is a diagram showing a schematic configuration of an oil-cooled screw compressor system as well as a schematic cross section of a screw compressor.

FIG. 1 is a diagram showing a schematic configuration of an oil-cooled screw compressor system according to one embodiment.

The oil-cooled screw compressor system includes an oil-cooled screw compressor (hereinafter, also referred to as a screw compressor) 10, a tooth surface lubricating fluid supply system 12, a bearing lubricating fluid supply system 14, a separation gas supply system 16, and a control system 18.

Figure 2:
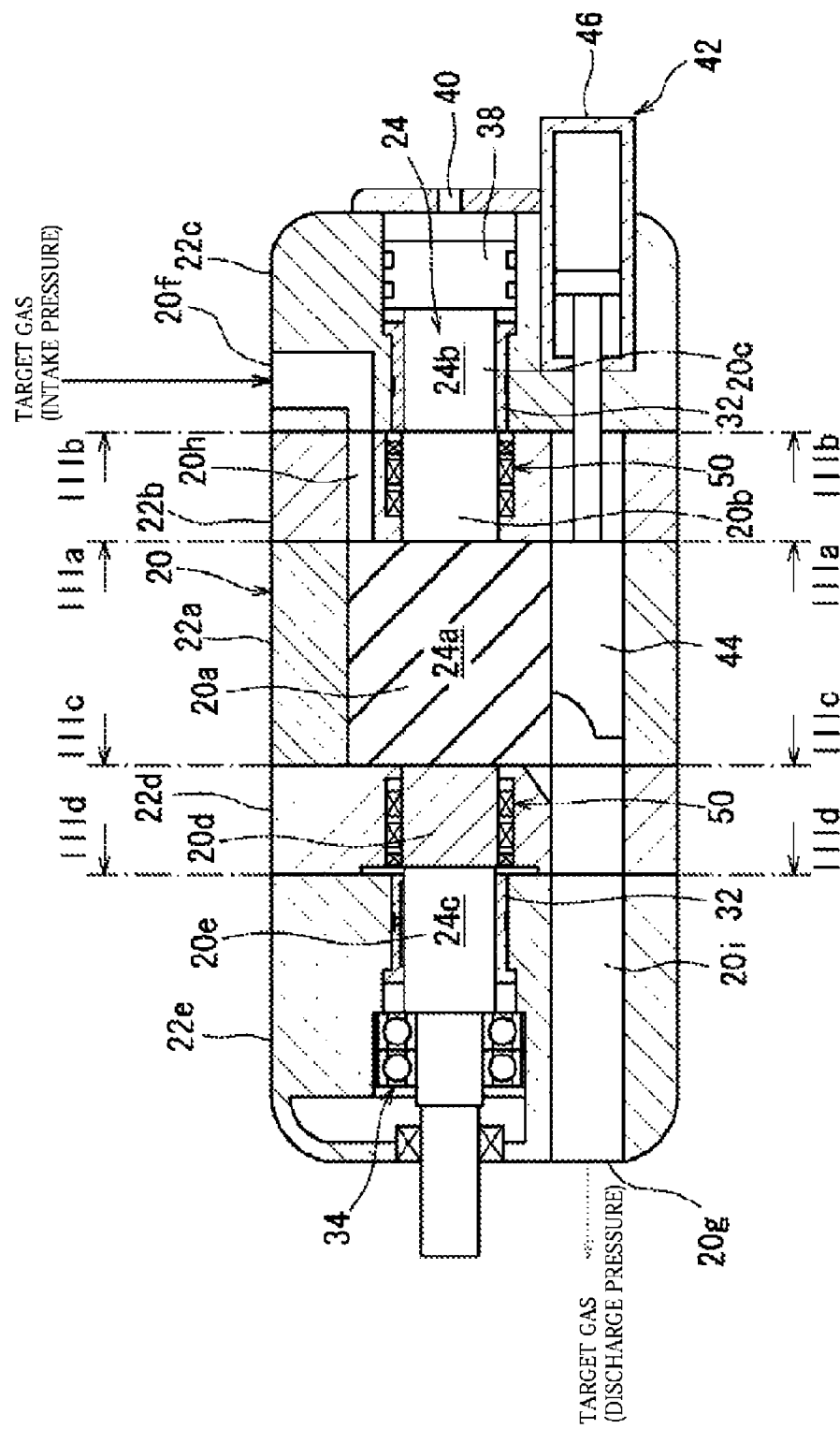
FIG. 2 is a schematic cross sectional view of the oil-cooled screw compressor taken along the line II-II in FIG. 1.

FIG. 1 shows a schematic cross section of the screw compressor 10 along a horizontal plane. FIG. 2 shows a schematic cross section of the screw compressor 10 along a vertical plane.

As shown in FIG. 1 and FIG. 2, the screw compressor 10 includes a housing 20. In the housing 20, a screw chamber 20a, intake side seal chambers 20b connected to one end of the screw chamber 20a, intake side bearing chambers 20c which communicates with the screw chamber 20a via the intake side seal chambers 20b, discharge side seal chambers 20d connected to the other end of the screw chamber 20a, and discharge side bearing chambers 20e which communicates with the screw chamber 20a via the discharge side seal chambers 20d, are defined.

The housing 20 includes an intake port 20f and a discharge port 20g which are both open toward the outside. When the screw compressor 10 is under operation, gas (hereinafter, referred to as target gas) at a low pressure (intake pressure) as a target of compression is drawn in through the intake port 20f, and the target gas at a high pressure (discharge pressure) as a result of the compression is discharged through the discharge port 20g.

In the housing 20, an intake path 20f through which the intake port 20f communicates with the one end (intake end) of the screw chamber 20a and a discharge path 20i which communicates with the other end (discharge end) side of the screw chamber 20a, are further defined.

In the present embodiment, the housing 20 includes: a screw casing 22a which defines the screw chamber 20a; an intake side seal casing 22b which defines the intake side seal chambers 20b; an intake side bearing casing 22c which defines the intake side bearing chambers 20c; a discharge side seal casing 22d which defines the discharge side seal chambers 20d; and a discharge side bearing casing 22e which defines the discharge side bearing chambers 20e. The discharge side bearing casing 22e, the discharge side seal casing 22d, the screw casing 22a, the intake side seal casing 22b, and the intake side bearing casing 22c are detachably coupled to each other in series in this order by bolts.

The housing 20 incorporates a pair of male and female screw rotors 24 and 26 in a rotatable manner. The male and female screw rotors 24 and 26 are disposed with their respective rotational axes in parallel with each other.

More specifically, the male and the female screw rotors 24 and 26 respectively include: screws 24a and 26a; intake side shafts 24b and 26b which coaxially and integrally extend from one ends (intake side ends) of the screws 24a and 26a, respectively; and discharge side shafts 24c and 26c which coaxially and integrally extend from the other ends (discharge side ends) of the screws 24a and 26a, respectively.

The screw 24a of the male screw rotor 24 has a plurality of screw-shaped protrusions on the outer circumference. The screw 26a of the female screw rotor 26 has a plurality of screw-shaped recesses on the outer circumference. The screws 24a and 26a are disposed in parallel with each other in the screw chamber 20a while meshing each other.

The discharge side shaft 24c of the male screw rotor 24 airtightly penetrates through an end wall of the housing 20 to protrude toward the outside. For example, a hydraulic motor or an electric motor as a power source is coupled to the discharge side shaft 24c. Rotational force is input to the discharge side shaft 24c from the power source. When the rotational force is input to the discharge side shaft 24c, the male screw rotor 24 rotates, whereby the female screw rotor 26 synchronously rotates due to the meshing between the screws 24a and 26a.

Figure 3:
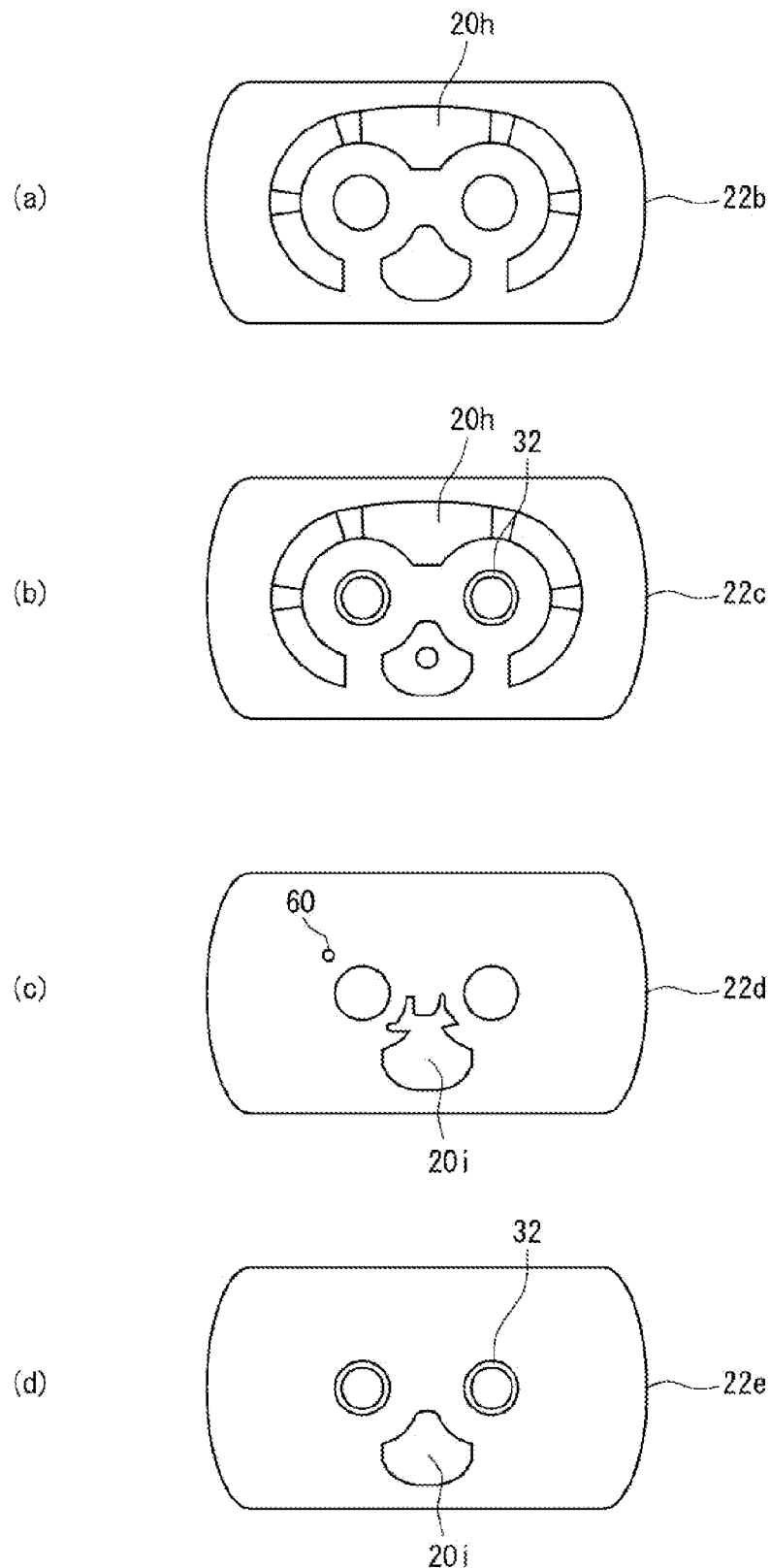
FIG. 3(a) is a diagram showing a schematic end surface of an intake side seal casing taken along the line IIIa-IIIa in FIG. 2.
FIG. 3(b) is a diagram showing a schematic end surface of an intake side bearing casing taken along the line IIIb-IIIb in FIG. 2.
FIG. 3(c) is a diagram showing a schematic end surface of a discharge side seal casing taken along the line IIIc-IIIc in FIG. 2.
FIG. 3(d) is a diagram showing a schematic end surface of a discharge side bearing casing taken along the line IIId-IIId in FIG. 2.

The plurality of protrusions and grooves of the screws 24a and 26a define a plurality of compression chambers in the screw chamber 20a. The intake path 20h, connecting between the intake port 20f and the compression chamber, is formed in the intake side seal casing 22b and the intake side bearing casing 22c. The intake path 20h has an inlet in an end surface of the intake side seal casing 22b facing the screw casing 22a as illustrated in FIG. 3(a). As illustrated in FIG. 3(b), an opening which has the same shape as the inlet and thus corresponds to the intake path 20h is formed in an end surface of the intake side bearing casing 22c facing the intake side seal casing 22b.

The discharge path 20i, connecting between the discharge port 20g and the compression chamber, is formed in the discharge side seal casing 22d and the discharge side bearing casing 22c. As illustrated in FIG. 3(c), the discharge path 20i has an outlet in an end surface of the discharge side seal casing 22b facing the screw casing 22a.

As shown in FIG. 3(d), an opening which has partially the same shape as the outlet and thus corresponds to the discharge path 20i is formed in an end surface of the discharge side bearing casing 22e facing the discharge side seal casing 22d. More specifically, the outlet in the discharge side seal casing 22d has an axial direction communication portion which communicates with the compression chamber in the axial direction, in an upper portion, whereas the opening in the end surface of the discharge side bearing casing 22e has no axial direction communication portion.

The compression chamber intermittently communicates with the inlet of the intake path 20h and communicates with the outlet of the discharge path 20i at the timing different from that of the inlet in accordance with the synchronous rotation of the screws 24a and 26a.

As soon as the communication with the inlet is blocked, the capacity of the compression chamber starts to reduce gradually along with the synchronous rotation of the screws 24a and 26a. Thus, the target gas is compressed in the compression chamber. When the compression chamber communicates with the outlet, the compressed target gas is discharged to the discharge path 20i from the compression chamber through the outlet.

Referring back to FIG. 1 and FIG. 2, oil, as an example of a tooth surface lubricating fluid, is supplied to the screws 24a and 26a. Thus, a tooth surface lubricating fluid flow path 30, through which the screw chamber 20a communicates with the outside, is formed in the housing 20.

A slide bearing 32, as a radial bearing, is provided in each of the intake side bearing chamber 20c and the discharge side bearing chamber 20e to rotatably support the corresponding one of the male screw rotor 24 and the female screw rotor 26.

For example, angular ball bearings 34, as thrust bearings, are disposed in the discharge side bearing chamber 20e. The angular ball bearings 34 fit the discharge side shaft 24c of the male screw rotor 24 and the discharge side shaft 26c of the female screw rotor 26. The angular ball bearings 34 receive a thrust load (compression reaction) produced by the compression of the target gas in the compression chamber.

A bearing lubricating fluid is supplied to the slide bearings 32 and the angular ball bearings 34. Thus, a bearing lubricating fluid flow path 36, through which the intake side bearing chamber 20c and the discharge side bearing chamber 20e communicate with the outside, is formed in the housing 20.

The bearing lubricating fluid flow path 36 includes: a supply portion through which the bearing lubricating fluid is supplied to the intake side discharge chamber 20c and the discharge side bearing chamber 20e; and a return portion through which the bearing lubricating fluid flows out from the intake side discharge chamber 20c and the discharge side bearing chamber 20e.

A piston (balance piston) 38 is attached to the intake side shaft 24b of the male screw rotor 24 for reducing the thrust load imposed on the thrust bearing. A cylinder (balance cylinder) is defined as a part of the intake side bearing chamber 20c. The balance cylinder incorporates the balance piston 38 in such a manner as to be able to slide in the axial direction of the male screw rotor 24. The thrust load can be reduced by adjusting the pressure in the balance cylinder.

Thus, a pressure fluid supply path 40, through which the balance cylinder communicates with the outside, is formed in the housing 20. The pressure in the balance cylinder can be adjusted by the pressure of the pressure fluid supplied through the pressure fluid supply path 40.

In the present embodiment, the pressure fluid supply path 40 is formed in a cover member which closes an opening end of the intake side bearing casing 22c.

In the present embodiment, the screw compressor 10 includes a capacity control device 42. The capacity control device 42 includes a capacity control piston 44 incorporated in a cylinder (capacity control cylinder) defined in the housing 20. The capacity control cylinder extends along the screw chamber 20a and communicates with the discharge path 20i. An end portion of the capacity control cylinder, on a side of the discharge path 20i, forms a radial direction communication portion which communicates with the compression chamber in the radial direction. Thus, the target gas compressed in the compression chamber can flow into the discharge path 20i through the radial direction communication portion of the outlet and the radial direction communication portion of the capacity control cylinder.

The capacity control piston 44 is disposed to be able to slide in the axial direction of the male and the female screw rotors 24 and 26. For example, the capacity control piston 44 is coupled to a hydraulic cylinder 46 as a driving device, and the capacity control piston 44 is moved back and forth in the capacity control cylinder by the hydraulic cylinder 46. In the capacity control device 42, the hydraulic cylinder 46 is controlled so that the position of the capacity control piston 44 is adjusted. Thus, the length of the compression chamber in the axial direction, that is, the compression start timing in the compression chamber, is adjusted, whereby the capacity of the screw compressor 10 is adjusted.

[Seal Device]

Seal devices 50 are disposed in the intake and the discharge side seal chambers 20b and 20d, and seal the circumferences of the intake side shafts 24b and 26b and the discharge side shafts 24c and 26c of the male screw rotor 24 and the female rotor 26.

Figure 4:
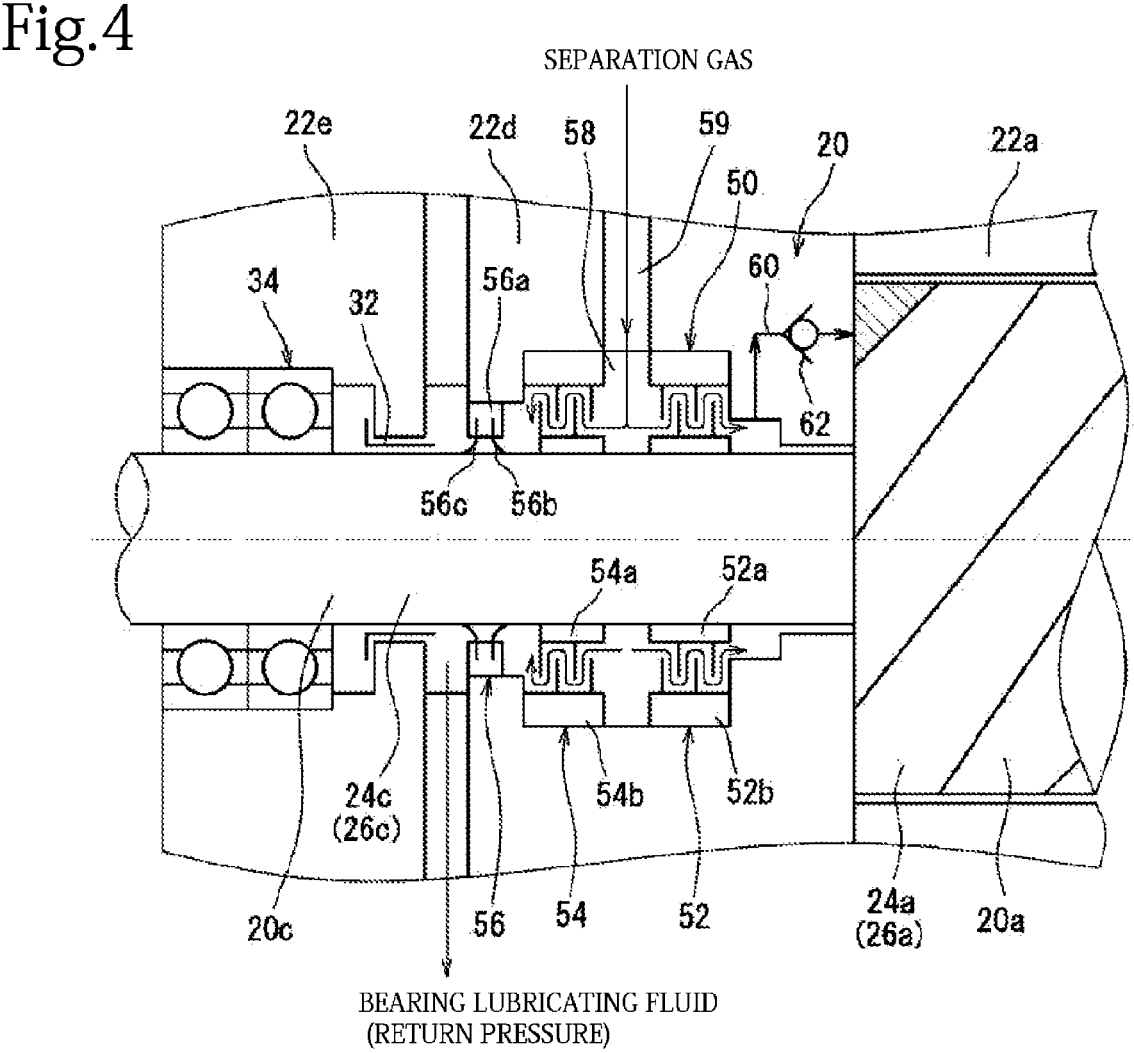
FIG. 4 is a diagram showing a schematic configuration of a seal device disposed in the discharge side seal chamber of the oil-cooled screw compressor in FIG. 1.

FIG. 4 shows a schematic configuration of the seal device 50 for the discharge side shaft 24c, 26c, disposed in the discharge side seal chamber 20d.

The seal device 50 includes a first seal unit and a second seal unit.

The first seal unit is disposed on a side of the screw chamber 20a, and the second seal unit is disposed on a side of the discharge bearing chamber 20e.

More specifically, the first seal unit includes a first labyrinth seal 52 as a non-contact seal member. The second seal unit includes a second labyrinth seal 54 as a non-contact seal member, and also includes a lip seal 56 as a contact seal member. The first labyrinth seal 52, the second labyrinth seal 54, and the lip seal 56 are arranged in this order from the side of the screw chamber 20a.

In the present embodiment, the first labyrinth seal 52 and the second labyrinth seal 54 respectively include: rotation members 52a and 54a which are fixed to the discharge side shaft 24c, 26c; and fixing members 52b and 54b which are fixed on the inner circumference surface of the discharge side seal chamber 20d.

The rotation members 52a and 54a each include: a sleeve portion which fits the discharge side shaft 24c, 26c; and a plurality of annular protrusions which protrude toward the outer side in the radial direction from the sleeve portion and are separated from each other in an axial direction of the sleeve portion.

The fixing members 52b and 54b each include: a sleeve portion which fits the inner circumference surface of the discharge side seal chamber 20d; and a plurality of annular protrusions which protrude toward the inner side in the radial direction from the sleeve portion and are separated from each other in the axial direction of the sleeve portion. The rotation members 52a and 54a and the fixing members 52b and 54b are disposed to have the protrusions meshing each other with a slight gap therebetween.

A separation gas supply gap 58 is formed between the first seal unit and the second seal unit. More specifically, the first labyrinth seal 52 and the second labyrinth seal 54 are disposed while being separated from each other in the axial direction of the discharge side shaft 24c, 26c, and the separation gas supply gap 58 is provided therebetween. A separation gas supply path 59 for supplying separation gas to the separation gas supply gap 58 is formed in the housing 20.

The lip seal 56 includes: a sleeve portion 56a which fits the inner circumference surface of the discharge side seal chamber 20d; and first and second wrap portions 56b and 56c which protrude toward the inner side in the radial direction from the sleeve portion 56a.

More specifically, the first wrap portion 56b is formed of an elastic material, and forms a trumpet shape. The outer circumference portion of the first wrap portion 56b is held by the sleeve portion 56a. The inner circumference portion of the first portion 56b elastically slides on the outer circumference surface of the discharge side shaft 24c, 26c.

The first wrap portion 56b has a curved cross sectional shape, whereby a portion on the first wrap portion 56b closer to the discharge side shaft 24c, 26c is closer to the screw chamber 20a. Thus, the first wrap portion 56b restricts the flow of the fluid in a direction from the screw chamber 20a to the discharge side bearing chamber 20e.

The second wrap portion 56c is also formed of an elastic material and forms a trumpet shape. The outer circumference portion of the second wrap portion 56c is held by the sleeve portion 56a. The inner circumference portion of the second wrap portion 56c elastically slides on the outer circumference surface of the discharge side shaft 24c, 26c.

The second wrap portion 56c, which is disposed closer to the discharge bearing chamber 20e than the first wrap portion 56b, has a curved cross sectional shape, whereby a portion on the second wrap portion 56c closer to the discharge side shaft 24c, 26c is closer to the discharge side bearing chamber 20e. Thus, the second wrap portion 56c restricts the flow of the fluid in a direction from the discharge side bearing chamber 20e to the screw chamber 20a.

The fixing members 52b and the 54b of the first and the second labyrinth seals 52 and 54, which are formed of different members in the present embodiment, may be formed as a single member.

Similarly, the rotation members 52a and 54a may be formed as a single member.

Furthermore, the rotation members 52a and 54a may be integrally formed on the outer circumference surface of the discharge side shaft 24c, 26c.

In the present embodiment, the lip seal 56 includes the first and the second wrap portions 56b and 56c which are disposed to face opposite directions and each form a lip seal. Alternatively, two lip seals each including a single wrap portion may be disposed while facing the opposite directions.

In the housing 20, a pressure balancing path 60, through which the discharge side seal chamber 20d and the screw chamber 20a communicate with each other, is formed. One end of the pressure balancing path 60 has an opening in an area in the discharge side seal chamber 20d closer to the screw chamber 20a than the first labyrinth seal 52. The other end of the pressure balancing path 60 has an opening in an end wall of the screw chamber 20a. Referring also to FIG. 3(c), a position of the opening of the other end of the pressure balancing path 60 is set in such a manner that the pressure balancing path 60 communicates with the compression chamber (hatched area in FIG. 4) as soon as the communication between the pressure balancing path 60 and the intake path 20h is blocked.

Referring also to FIG. 1, in the present embodiment, the pressure balancing path 60 is provided only between the discharge side seal chamber 20d, in which the discharge side shaft 26c of the female screw rotor 26 is inserted, and the screw chamber 20a. The two discharge side seal chambers 20d communicate with each other through a communication path 61.

A check valve 62 is disposed in the pressure balancing path 60. The check valve 62 enables the flow of the fluid in the direction from the discharge side seal chamber 20d to the screw chamber 20a, but restricts the flow of the fluid in the opposite direction.

In the present embodiment, the check valve 62 is constantly opened, but is closed only when the pressure in the compression chamber which communicates with the pressure balancing path 60 exceeds the pressure in the discharge side seal chamber 20d.

Figure 5:
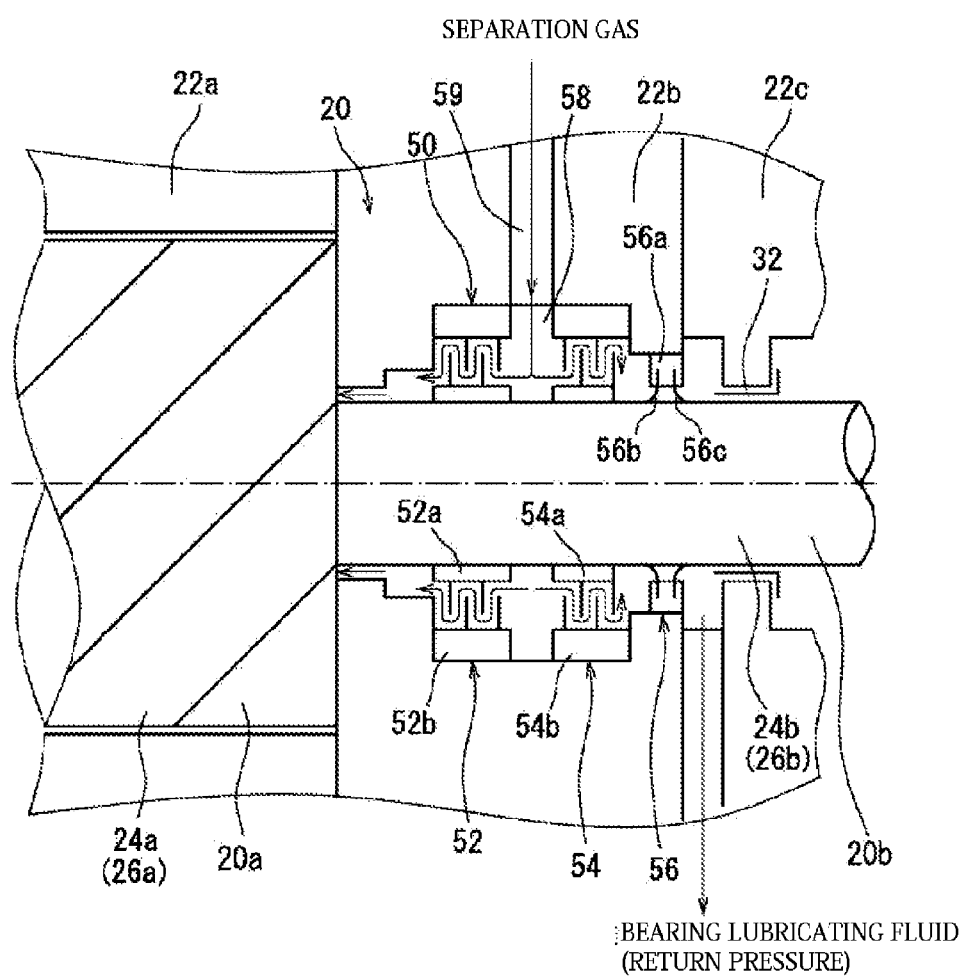
FIG. 5 is a diagram showing a schematic configuration of a seal device disposed in the intake side seal chamber of the oil-cooled screw compressor in FIG. 1.

FIG. 5 schematically shows the seal device 50 disposed in the intake side seal chamber 20b.

The configuration of the seal device 50 disposed in the intake side seal chamber 20b is substantially the same as that of the seal device 50 disposed in the discharge side seal chamber 20d. Thus, the same configurations are denoted with the same reference numerals and will not be described.

It is to be noted that the pressure balancing path and the check valve are not provided between the intake side seal chamber 20b and the screw chamber 20a.

[Tooth Surface Lubricating Fluid Supply System]

Referring back to FIG. 1, the tooth surface lubricating fluid supply system 12 includes a gas-liquid separation device 64. An inlet of the gas-liquid separation device 64 is connected to the discharge port 20g of the screw compressor 10 through a pipe for example. The gas-liquid separation device 64 includes a separation tank 66. A filter 68 which separates the target gas and the tooth surface lubricating fluid is disposed in an upper portion of the separation tank 66. A storage unit 70 which temporarily stores the tooth surface lubricating fluid thus separated is provided in a lower portion of the separation tank 66. The inlet of the gas-liquid separation device 64 communicates with the inside of the separation tank 66 at a portion between the storage unit 70 and the filter 68.

A gas outlet for the target gas is provided in a top portion of the separation tank 66 above the filter 68, whereby the high pressure target gas thus separated is supplied to the outside through the gas outlet.

A liquid outlet for the tooth surface lubricating fluid is provided in a bottom portion of the separation tank 66. The liquid outlet is connected to the tooth surface lubricating fluid flow path 30 of the screw compressor 10 through a pipe for example. When the screw compressor 10 is under operation, the pressure in the separation tank 66 becomes equal to the pressure of the compressed target gas, that is, the discharge pressure. Thus, the tooth surface lubricating fluid, at the discharge pressure, is supplied to the screw compressor 10.

In the present embodiment, the tooth surface lubricating fluid is used as the working fluid for the driving device for the capacity control device 42. Thus, the lower portion of the separation tank 66 is connected to a switching valve 72 through a pipe, and an outlet of the switching valve 72 is connected to the intake port 20f through a pipe. The switching valve 72 includes two switching ports which are respectively connected to two ports of the hydraulic cylinder 46. The position of a valve body of the switching valve can be controlled from the outside, and the capacity of the screw compressor 10 can be controlled by controlling the position of the valve body.

[Bearing Lubricating Fluid Supply System]

The bearing lubricating fluid supply system 14 includes a storage tank 74 which can store the bearing lubricating fluid at a pressure higher than the atmospheric pressure. An outlet of the storage tank 74 is connected to the supplying portion of the bearing lubricating fluid flow path 36 through a pipe for example. A pump 76 which generates a flow of the bearing lubricating fluid in a direction from the storage tank 74 to the screw compressor 10 and a heat exchanger 78 which cools the bearing lubricating fluid are disposed at intermediate portions of the pipe.

In the present embodiment, the pipe is branched at a portion on a downstream side of the heat exchanger 78 to be also connected to the pressure fluid supply path 40 of the screw compressor 10. Thus, one of the branched pipes (first pipe) is connected to the supplying portion of the bearing lubricating fluid flow path 36, and the other one of the branched pipes (second pipe) is connected to the pressure fluid supply path 40. A control valve 80, with which the pressure of the bearing lubricating fluid can be adjusted, is disposed at an intermediate portion of the first pipe.

An inlet of the storage tank 74 communicates with the returning portion of the bearing lubricating fluid flow path 36 through a pipe for example. Thus, the bearing lubricating fluid which has flowed out from the screw compressor 10 flows into the storage tank 74 and then is supplied to the screw compressor 10 again.

In the present embodiment, the returning portion of the bearing lubricating fluid flow path 36 has two outlets respectively formed in the intake side seal casing 22b and the discharge side seal casing 22d. The return portion of the bearing lubricating fluid flow path 36 is formed in the intake side seal casing 22b, the intake side bearing casing 22c, the discharge side seal casing 22d, and the discharge side bearing casing 22e, whereby the outlets of the return portion of the bearing lubricating fluid flow path 36 communicate with the intake side bearing chamber 20c and the discharge side bearing chamber 20e.

In the present embodiment, the supply portion of the bearing lubricating fluid flow path 36 has a single inlet formed in the discharge side bearing casing 22e. The supply portion of the bearing lubricating fluid flow path 36 is formed in the screw casing 22a, the intake side seal casing 22b, the intake side bearing casing 22c, the discharge side seal casing 22d, and the discharge side bearing casing 22e, whereby the inlet of the supply portion of the bearing lubricating fluid flow path 36 communicates with the intake side bearing chamber 20c and the discharge side bearing chamber 20e.

[Separation Gas Supply System]

The separation gas supply system 16 supplies separation gas to the screw compressor 10 when the screw compressor 10 is under operation. For example, insert gas such as nitrogen may be used as the separation gas.

The separation gas supply system 16 includes a compressor and a high pressure cylinder as a separation gas supply source 82 for example, and can supply high pressure separation gas to the screw compressor 10. The separation gas supply source 82 is connected to a separation gas supply path 59 of the screw compressor 10 through a pipe for example. For example, a control valve 84 is disposed at an intermediate portion of the pipe. The supply pressure for the separation gas to the separation gas supply path 59 can be adjusted by adjusting an opening degree of the control valve 84.

In the present embodiment, each seal device 50 includes a single separation gas supply path 59, and the separation gas is supplied to each separation gas supply path 59 through the control valve 84.

In the present embodiment, the separation gas supply source 82 is connected to the storage tank 74 through a pipe for example. A control valve 86 is disposed in an intermediate portion of the pipe. The supply pressure for the separation gas to the storage tank 74 can be adjusted by adjusting an opening degree of the control valve 86. Thus, the separation gas is also used as pressurization gas for raising the pressure in the storage tank 74.

By adjusting the supply pressure for the separation gas to the storage tank 74, the pressure in the storage tank 74 can be adjusted, and the pressure of the bearing lubricating fluid supplied to the screw compressor 10 can further be adjusted.

[Control System]

The control system 18 includes a control device 88 and a plurality of sensors. For example, the control device 88 is formed of a computer including a central processing device, a memory, an external storage device, an input/output device, and the like.

For example, as sensors which provide information for a control to the control device 88, the control system 18 includes: an intake pressure sensor 90a which detects an intake pressure of the target gas drawn into the intake port 20f; a discharge pressure sensor 90b which detects a discharge pressure of the target gas which is discharged from the discharge port 20g; a primary pressure sensor 90c which detects a pressure of the bearing lubricating fluid supplied to the pressure fluid supply path 40; a secondary pressure sensor 90d which detects a pressure of the bearing lubricating fluid supplied to the supply portion of the bearing lubricating fluid flow path 36; and a return pressure sensor 90e which detects a pressure (return pressure) of the bearing lubricating fluid flowing out from the return portion of the bearing lubricating fluid flow path 36.

The control device 88 performs an integrated control of operations of the entire system of the screw compressor 10 based on an instruction from the outside and the information detected by the sensors.

For example, the control device 88 controls the power source so that the amount of power supplied to the screw compressor 10 is adjusted, controls an unillustrated pump and the like so that the amount of coolant supplied to the heat exchanger is adjusted, controls the pump 76 so that the supplied amount of the bearing lubricating fluid is adjusted, and controls the switching valve 72 so that the capacity of the screw compressor 10 is adjusted.

The control device 88 adjusts the opening degree of the control valve 84 so that the supply pressure for the separation gas to the separation gas supply path 59 is adjusted, adjusts the opening degree of the control valve 86 so that the pressure in the storage tank 74 is adjusted, and thus adjusts the supply pressure for the bearing lubricating fluid to the pressure fluid supply path 40. The control device 88 adjusts the opening degree of the control valve 80 so that the supply pressure for the bearing lubricating fluid to the supply portion of the bearing lubricating fluid flow path 36 is adjusted.

In the present embodiment, the control device 88 adjusts the opening degree of the control valve 84 in such a manner that the separation gas is supplied to the separation gas supply path 59 with the supply pressure (separation gas supply pressure) higher than the intake pressure detected by the intake pressure sensor 90a.

More specifically, when the intake pressure is in a range from 0.1 MPa to 0.6 MPa for example, the control device 88 performs a control in such a manner that the separation gas supply pressure becomes higher than the intake pressure by about 0.04 MPa to 0.11 MPa.

The separation gas supply pressure within this range does not exceed the discharge pressure.

In the present embodiment, the control device 88 adjusts the opening degrees of the control valves 86 and 80 in such a manner that the return pressure of the bearing lubricating fluid flowing out from the screw compressor 10, detected by the return pressure sensor 90e, becomes equal to or higher than the intake pressure and becomes lower than the separation gas supply pressure.

In the present embodiment, the control device 88 adjusts the return pressure so that a pressure substantially equal to a pressure in areas, in the intake side seal chamber 20b and the discharge side seal chamber 20d, closer to the screw chamber 20a than the first labyrinth seal 52 is applied to the sides on the intake side bearing chamber 20c and the discharge side bearing chamber 20e of the second lip portion 56c. For example, the control device 88 performs a control so that the return pressure of the bearing lubricating fluid is set to be approximately within a range from 0.01 MPa to 0.7 MPa when the intake pressure is within a range from 0.1 MPa to 0.6 MPa.

In the screw compressor system of one embodiment described above, the separation gas supply gap 58 is defined between the first seal unit and the second seal unit of the seal device 50. When the screw compressor 10 is under operation, the separation gas is supplied to the separation gas supply gap 58. The separation gas thus supplied leaks out to the screw chamber 20a through the first seal unit. Thus, when the screw compressor 10 is under operation, the first seal unit prevents the target gas from flowing into the intake side bearing chamber 20c and the discharge side bearing chamber 20e, thereby preventing the target gas from coming into contact with the bearing lubricating fluid. Thus, the degradation of the bearing can be surely prevented, even when the target gas includes a corrosive element.

In this configuration, even when the high pressure target gas from the compression chamber flows into the discharge side seal chamber 20d, the target gas thus flowed in is returned to the compression chamber through the pressure balancing path 60. Thus, the pressure of the target gas in the area, in the discharge side seal chamber 20d, closer to the screw chamber 20a than the first seal unit, is reduced. All things considered, the target gas is surely prevented from passing through the first seal unit to leak out.

In this configuration, the target gas is returned to the compression chamber through the pressure balancing path 60. Thus, the first seal unit prevents the target gas and the tooth surface lubricating fluid from passing through in the direction from the screw chamber 20a to the intake side bearing chamber 20c and the discharge side bearing chamber 20e, without raising the supply pressure of the separation gas supplied to the discharge side seal chamber 20d over the discharge pressure of the target gas discharged from the screw compressor 10. Thus, the supply pressure of the separation gas can be set to be lower than the discharge pressure, whereby a less amount of separation gas is consumed.

In this configuration, the target gas which has flowed into the discharge side seal chamber 20d is returned to the compression chamber in a state of having a higher pressure than the intake pressure, through the pressure balancing path 60. Thus, the degradation of the efficiency of the screw compressor 10 is prevented. As a result, the screw compressor 10 is operated at a low cost.

In the screw compressor 10 used in the screw compressor system of the one embodiment, the intake side seal casing 22b and the discharge side seal casing 22d are detachably coupled to the screw casing 22a. The intake side bearing casing 22c and the discharge side bearing casing 22e are detachably coupled to the screw casing 22a via the intake side seal casing 22b and the discharge side seal casing 22d.

Because the housing 20 is thus formed of a plurality of separable casings, the screw compressor 10 and the oil-cooled screw compressor which compresses the target gas including no corrosive element can share the screw casing 22a as well as the intake side and the discharge side bearing casings 22c and 22d. Thus, the components of the screw compressor 10 are highly versatile, and the cost of the screw compressor system can be reduced.

Figure 6:
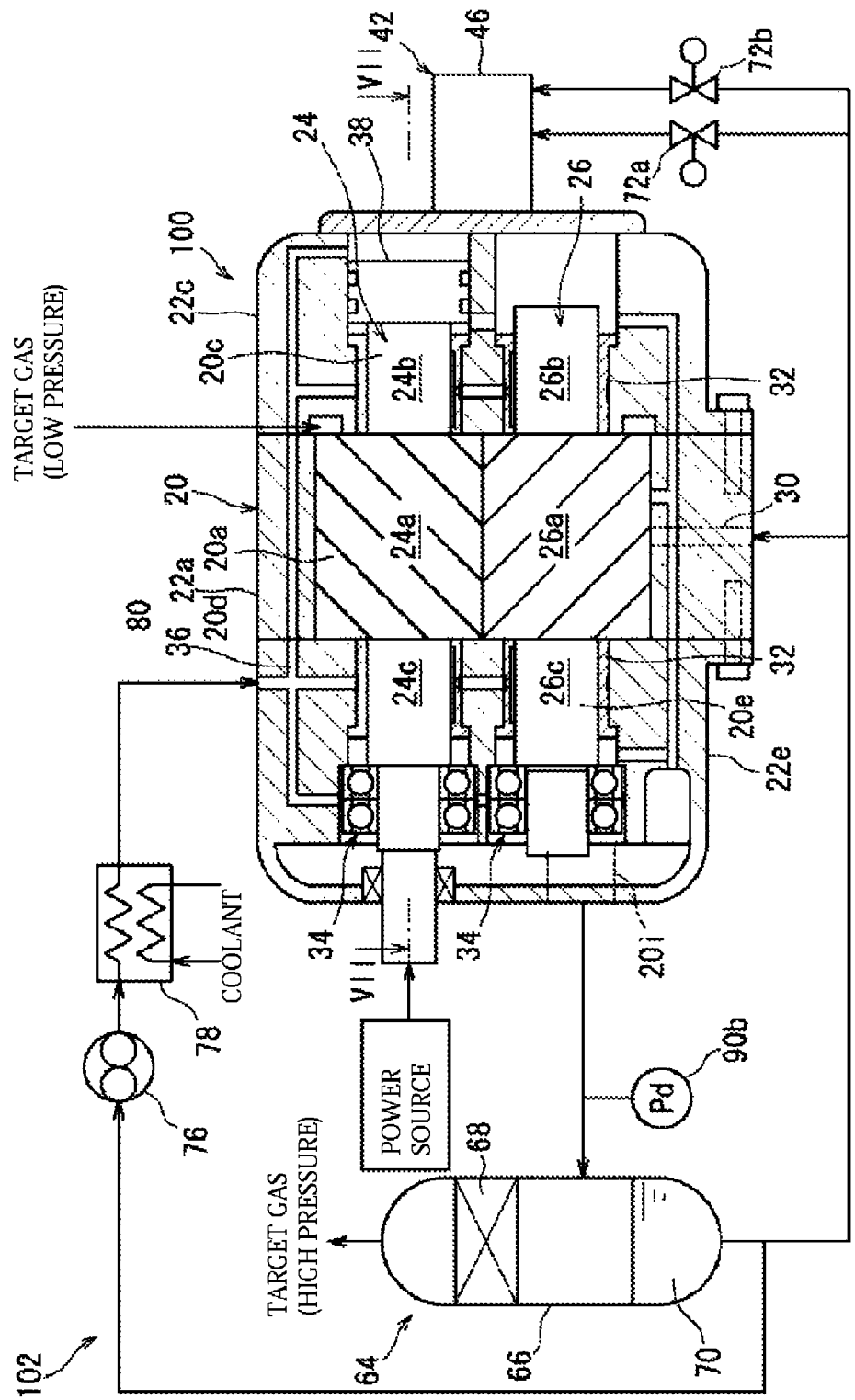
FIG. 6 is a diagram showing a schematic configuration of an oil-cooled screw compressor system including an oil-cooled screw compressor which includes the intake side bearing casing and the discharge side bearing casing of the oil-cooled screw compressor shown in FIG. 1 and is applied to target gas including no corrosive element.

FIG. 6 shows a schematic configuration of an oil-cooled screw compressor system using an oil-cooled screw compressor 100 which compresses the target gas including no corrosive element. In the oil-cooled screw compressor system, a single lubricant fluid supply system 102 supplies the tooth surface lubricating fluid and the bearing lubricating fluid to the screw compressor 100. The configuration which are the same or similar to the counterparts in the oil-cooled screw compressor system shown in FIG. 1 are denoted with the same reference numerals and will not be described.

Figure 7:
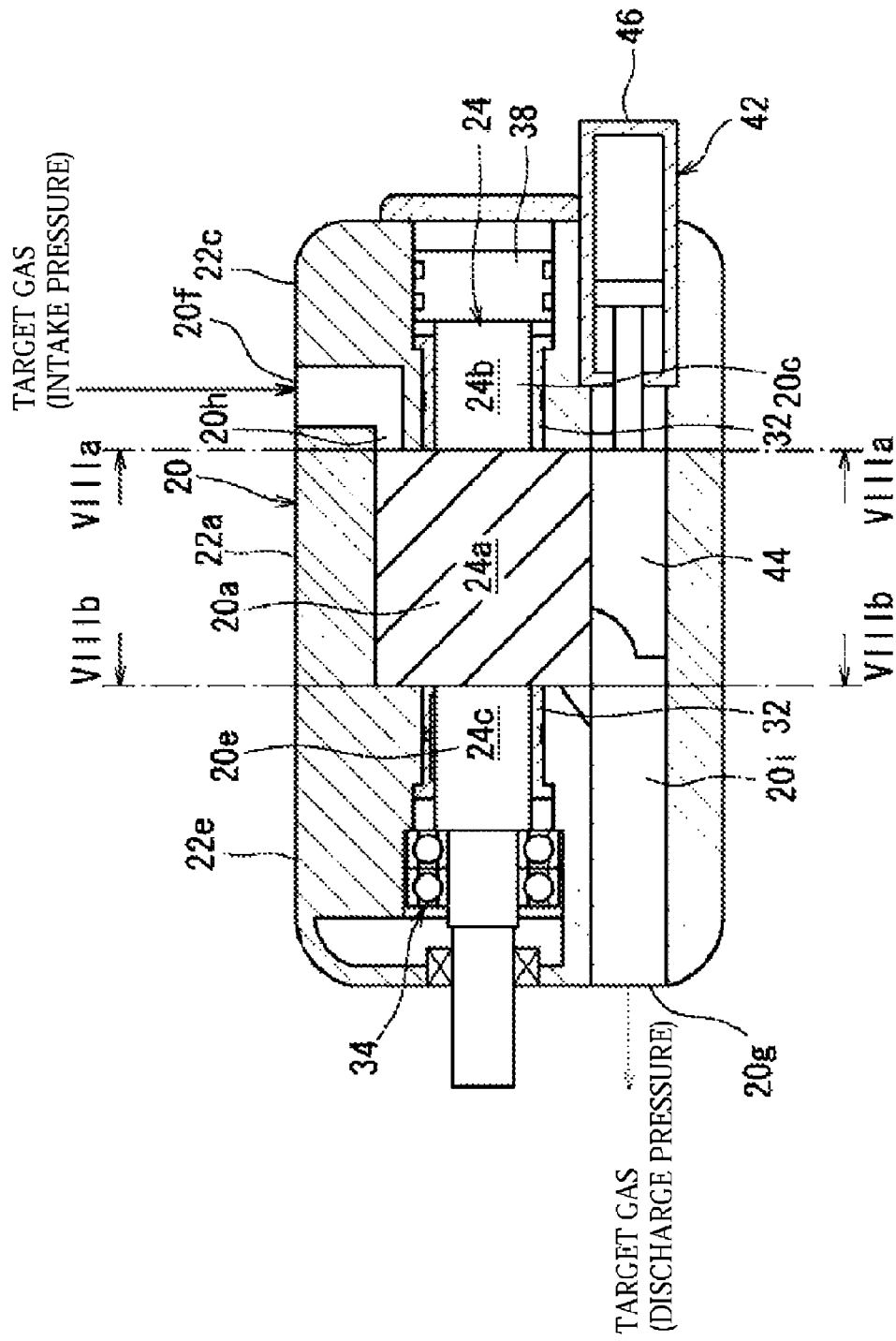
FIG. 7 is a schematic cross-sectional view of the oil-cooled screw compressor taken along the line VII-VII in FIG. 6.

FIG. 7 shows a schematic cross section of the screw compressor 100 taken along the line VII-VII in FIG. 1. As shown in FIG. 6 and FIG. 7, the screw compressor 100 includes the intake side bearing casing 22c and the discharge side bearing casing 22e which are substantially the same as the counterparts in the screw compressor 10.

The screw compressor 100 is different from the screw compressor 10 in that the intake side and the discharge side seal casings 22b and 22d are not provided. Due to this difference, the screw compressor 10 and the screw compressor 100 are different from each other in the lengths of the intake side shafts 24b and 26b and the discharge side shafts 24c and 26c of the male and the female screw rotors 24 and 26.

FIGS. 8(a) and 8(b) schematically show end surfaces of the intake side bearing casing 22c and the discharge side bearing casing 22e used in the screw compressor 100. As shown in FIG. 8(b), the discharge path 20i has an outlet in the discharge side bearing casing 22e and the outlet includes an axial direction communication portion.

In the screw compressor 10 used in the screw compressor of the one embodiment, the first lip portion 56b (first lip seal) restricts the flow of the fluid in the directions from the screw chamber 20a to the intake side bearing chamber 20c and the discharge side bearing chamber 20e. Thus, even when the separation gas is not supplied while the screw compressor 10 is stopped, the target gas is prevented from flowing into the intake side bearing chamber 20c and the discharge side bearing chamber 20e, whereby corrosion of the slide bearing 32 and the angular ball bearing 34 is prevented.

The second lip portion 56c (second lip seal) of the lip seal 56 restricts the flow of the fluid in the directions from the intake side bearing chamber 20c and the discharge side bearing chamber 20e to the screw chamber 20a. Thus, even when the separation gas is not supplied while the screw compressor 10 is stopped, the bearing lubricating fluid is prevented from flowing into the screw chamber 20a, whereby the reduction of the bearing lubricating fluid is suppressed, and thus the screw compressor 10 can be operated at a low cost.

Furthermore, a constantly opened check valve 62 is used, whereby abnormal pressure rise in the discharge side seal chamber 20d can surely be prevented.

In the screw compressor of the one embodiment, a control is performed so that the supply pressure of the separation gas becomes equal to or higher than the intake pressure and equal to or lower than the discharge pressure. Thus, the consumption amount of the separation gas is small, and the screw compressor 10 can be operated at a low cost.

In the screw compressor system of the one embodiment, the control is performed so that the return pressure of the bearing lubricating fluid becomes equal to or higher than the intake pressure and lower than the supply pressure of the separation gas. Thus, the pressure difference between the separation gas supply gap 58 and the intake side bearing chamber 20c or the discharge side bearing chamber 20e is kept small. Thus, the fluid is prevented from flowing from the intake side bearing chamber 20c and the discharge side bearing chamber 20e to the screw chamber 20a with a small amount of consumed separation gas. Thus, the screw compressor 10 can be operated at a low cost.

In the screw compressor system of the one embodiment, the supply pressure of the bearing lubricating fluid can be raised up to or over the intake pressure with a simple configuration, through raising the pressure in the storage tank 74 by using gas of the same type as the separation gas, as the pressure gas.

In the screw compressor system of the one embodiment, the control device 88 of the control system 18 controls the control valve 84 based on the detection result of the intake pressure sensor 90a. Thus, the supply pressure of the separation gas can be accurately controlled with a simple configuration.

In the screw compressor system of the one embodiment, the tooth surface lubricating fluid is used as the working fluid for the capacity control device 42. Thus, the target gas is prevented from being mixed into the bearing lubricating fluid in the capacity control device 42. Thus, the corrosion of the slide bearing 32 and the angular ball bearing 34 can surely be prevented.

Finally, it is to be noted that this invention is not limited to the one embodiment described above, and includes an embodiment obtained by modifying the one embodiment described above.

Figure 9:
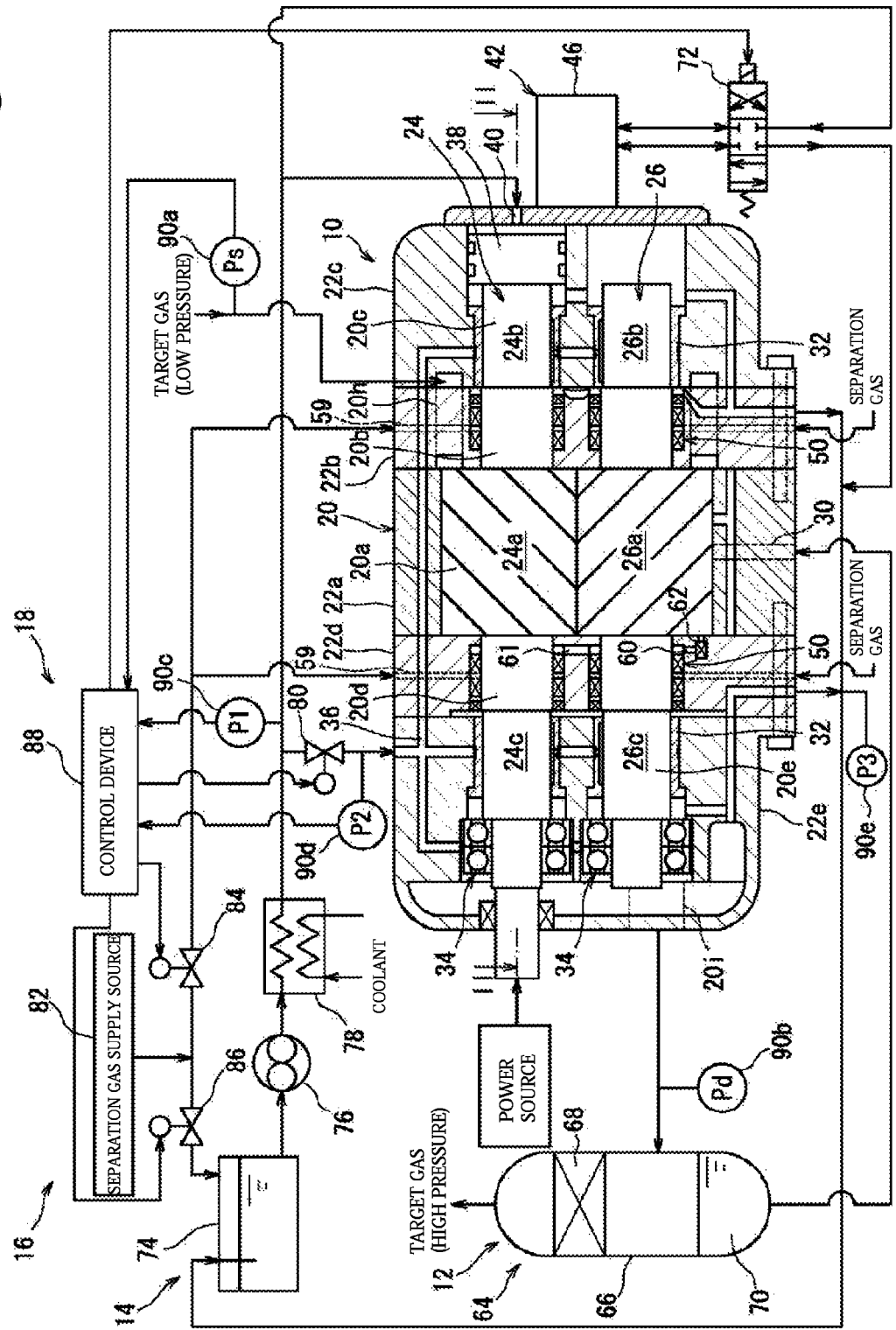
FIG. 9 is a diagram showing an example where a working fluid supply system for a hydraulic cylinder is changed in the system shown in FIG. 1.

For example, the bearing lubricating fluid may be used as the working fluid for the hydraulic cylinder 46 as shown in FIG. 9. In this case, the inlet of the switching valve 72 is connected to the heat exchanger 78 through a pipe, and outlet of the switching valve 72 is connected to the storage tank 74 through a pipe.

Figure 10:
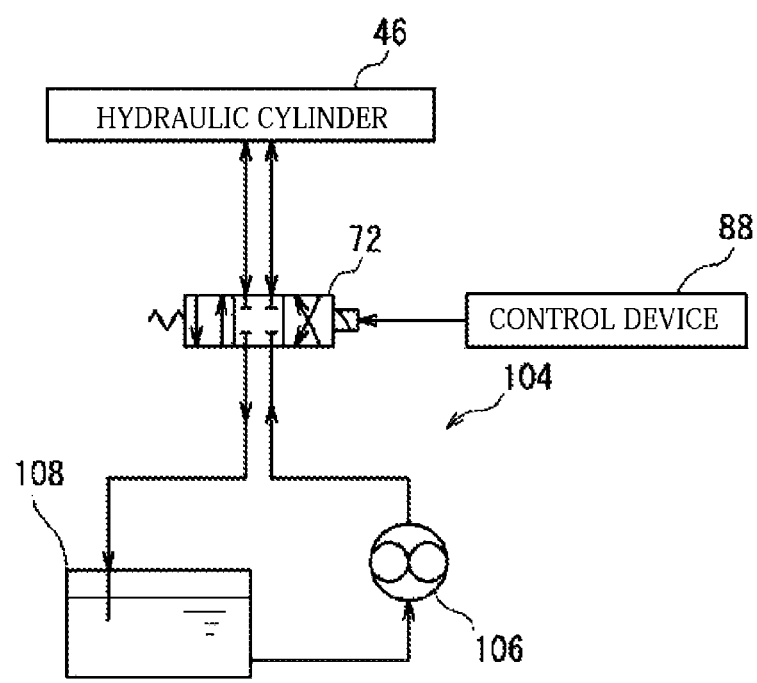
FIG. 10 is a diagram showing another modification of the working fluid supply system for the hydraulic cylinder.

Alternatively, a working fluid supply system 104 may be further provided as shown in FIG. 10. The working fluid supply system 104 supplies oil, different from the tooth surface lubricating fluid and the bearing lubricating fluid, to the hydraulic cylinder 46. The working fluid supply system 104 includes a pump 106 and a tank 108. An inlet of the pump 106 is connected to an outlet of the tank 108. The outlet of the pump 106 is connected to an inlet of the switching valve 72. An inlet of the tank 108 is connected to an outlet of the switching valve 72.

REFERENCE SIGNS LIST 10 oil-cooled screw compressor
12 tooth surface lubricating fluid supply system
14 bearing lubricating fluid supply system
16 separation gas supply system
18 control system
20 housing
20a screw chamber
20b intake side seal chamber (seal chamber)
20c intake side bearing chamber (bearing chamber)
20d discharge side seal chamber (seal chamber)
20e discharge side bearing chamber (bearing chamber)
24 male screw rotor
26 female screw rotor
24a,26a screw
24b,26b intake side shaft
24c,26c discharge side shaft
30 tooth surface lubricating fluid flow path
50 seal device
52 first labyrinth seal
54 second labyrinth seal
56 lip seal (first lip seal, second lip seal)
58 separation gas supply gap
59 separation gas supply path
60 pressure balancing path
62 check valve
64 gas-liquid separation device
74 storage tank
80,84,86 control valve
88 control device
90a intake pressure sensor
90b discharge pressure sensor
90c primary pressure sensor
90d secondary pressure sensor
90e return pressure sensor

The invention claimed is:
1. An oil-cooled screw compressor system comprising:
  an oil-cooled screw compressor;
  a tooth surface lubricating fluid supply system that supplies a tooth surface lubricating fluid to the oil-cooled screw compressor;

a bearing lubricating fluid supply system that supplies a bearing lubricating fluid to the oil-cooled screw compressor, in addition to the tooth surface lubricating fluid; and a separation gas supply system that supplies separation gas different from target gas compressed by the oil-cooled screw compressor to the oil-cooled screw compressor, wherein the oil-cooled screw compressor includes:

a housing in which a screw chamber, discharge side seal chambers connected to one end of the screw chamber, intake side seal chambers connected to the other end of the screw chamber, bearing chambers in communication with the screw chamber via either the discharge side seal chambers or the intake side seal chambers, respectively, a tooth surface lubricating fluid flow path through which the tooth surface lubricating fluid is supplied to the screw chamber, and a bearing lubricating fluid flow path through which the bearing lubricating fluid is supplied to the bearing chambers, are defined;

male and female screw rotors each including: a screw that is disposed in the screw chamber and forms a compression chamber; and shafts that coaxially extend from both ends of the screw to be disposed in the discharge side seal chambers and intake side seal chambers and the bearing chambers;

a plurality of bearings that are disposed in the bearing chambers, and rotatably support the respective shafts; and seal devices that are disposed in each of the discharge side seal chambers and the intake side seal chambers, and each seal a circumference of a corresponding one of the shafts, wherein the discharge side seal chambers are positioned on a discharge side of the compression chamber, and the intake side seal chambers are positioned on an intake side of the compression chamber, the seal devices each include:

a first seal unit that is disposed on a side of the screw chamber in each of the discharge side seal chambers and the intake side seal chambers; and a second seal unit that is disposed on a side of the bearing unit in each of the discharge side seal chambers and the intake side seal chambers, the second seal unit and the first seal unit defining a separation gas supply gap therebetween, in the housing, a separation gas supply path through which the separation gas is supplied into the separation gas supply gap, and a pressure balancing path through which an area closer to the screw chamber than the first seal unit in the discharge side seal chamber is in communication with the compression chamber under a pressure higher than an inlet pressure of the target gas sucked into the oil-cooled screw compressor and lower than a discharge pressure of the target gas discharged from the oil-cooled screw compressor, are defined in addition to the tooth surface lubricating fluid flow path and the bearing lubricating fluid flow path, and a check valve that restricts a flow of a fluid in a direction from the screw chamber to the discharge side seal chamber is disposed in the pressure balancing path.

2. The oil-cooled screw compressor system according to claim 1, wherein
the housing includes:
a screw casing which defines the screw chamber;

seal casings which are detachably coupled to the screw casing and define the discharge side seal chambers and intake side seal chambers and the pressure balancing path; and bearing casings which are detachably coupled to the screw casing via the respective seal casings, and define the respective bearing chambers.

3. The oil-cooled screw compressor system according to claim 1, wherein the first seal unit includes a first labyrinth seal having a first non-contact seal structure, and the second seal unit includes a second labyrinth seal having a second non-contact seal structure and a contact seal portion that are arranged in this order from the separation gas supply gap to the bearing chamber.

4. The oil-cooled screw compressor system according to claim 1, wherein the first seal unit includes a first labyrinth seal having a first non-contact seal structure, the second seal unit includes a second labyrinth seal having a second non-contact seal structure, a first lip seal portion having a first contact seal structure, and a second lip seal portion having a second contact seal structure that are arranged in this order from the separation gas supply gap to the bearing chamber, the first lip seal portion restricts a flow of a fluid in a direction from the screw chamber to the bearing chambers, and the second lip seal portion restricts a flow of a fluid in a direction from the bearing chambers to the screw chamber.

5. The oil-cooled screw compressor system according to claim 1 further comprising a control system which controls a supply pressure for the separation gas supplied to the oil-cooled screw compressor, wherein the control system controls the supply pressure for the separation gas in such a manner which the supply pressure for the separation gas supplied to the oil-cooled screw compressor becomes higher than the inlet pressure and lower than the discharge pressure.

6. The oil-cooled screw compressor system according to claim 5, wherein the control system controls a lubricating fluid supply pressure for the bearing lubricating fluid in such a manner which a return pressure of the bearing lubricating fluid flowing out from the oil-cooled screw compressor becomes equal to or higher than the intake pressure and lower than the supply pressure for the separation gas.

7. The oil-cooled screw compressor system according to claim 6, wherein the bearing lubricating fluid supply system includes a storage tank which stores the bearing lubricating fluid under a storage pressure higher than the intake pressure, and gas of a same type as the separation gas is used as pressurized gas with which a pressure in the storage tank rises up to the storage pressure.

8. The oil-cooled screw compressor system according to claim 5, wherein the control system includes
an intake pressure sensor which detects the intake pressure;
a control valve which is able to adjust the supply pressure for the separation gas; and
a control device which operates the control valve in accordance with a detection result of the intake pressure sensor.

9. The oil-cooled screw compressor system according to claim 1, wherein
the oil-cooled screw compressor further includes a capacity control device, and
the tooth surface lubricating fluid supply system supplies a working fluid to the capacity control device, the working fluid being part of the tooth surface lubricating fluid.

10. An oil-cooled screw compressor comprising:
a housing in which a screw chamber, discharge side seal chambers connected to one end of the screw chamber, intake side sea chambers connected to the other end of the screw chamber, bearing chambers in communication with the screw chamber via either the discharge side seal chambers or the intake side seal chambers, respectively, a tooth surface lubricating fluid flow path through which a tooth surface lubricating fluid is supplied to the screw chamber, and a bearing lubricating fluid flow path through which a bearing lubricating fluid is supplied to the bearing chambers in addition to the tooth surface lubricating fluid flow path, are defined;
male and female screw rotors each including: a screw which is disposed in the screw chamber and forms a compression chamber; and shafts which coaxially extend from both ends of the screw to be disposed in the discharge side seal chambers and intake side seal chambers and the bearing chambers;
a plurality of bearings which are disposed in the bearing chambers, and rotatably support the respective shafts; and
seal devices which are disposed in each of the discharge side seal chambers and the intake side seal chambers, and each seal a circumference of a corresponding one of the shafts, wherein
the discharge side seal chambers are positioned on a discharge side of the compression chamber, and the intake side sea chambers are positioned on an intake side of the compression chamber,
the seal devices each include:
a first seal unit which is disposed on a side of the screw chamber in each of the discharge side seal chambers and the intake side seal chambers; and
a second seal unit which is disposed on a side of the bearing unit in each of the discharge side seal chambers and the intake side seal chambers, the second seal unit and the first seal unit defining a separation gas supply gap therebetween,
in the housing, a separation gas supply path through which the separation gas is supplied into the separation gas supply gap, and a pressure balancing path through which an area closer to the screw chamber than the first seal unit in the discharge side seal chamber is in communication with the compression chamber under a pressure higher than an net pressure of the target gas sucked into the oil-cooled screw compressor and lower than a discharge pressure of the target gas discharged from the oil-cooled screw compressor, are defined in addition to the tooth surface lubricating fluid flow path and the bearing lubricating fluid flow path, and
a check valve which restricts a flow of a fluid in a direction from the screw chamber to the discharge side seal chamber is disposed in the pressure balancing path.

11. The oil-cooled screw compressor according to claim 10, wherein
the housing includes:
a screw casing which defines the screw chamber;
seal casings which are detachably coupled to the screw casing and define the discharge side seal chambers and intake side seal chambers and the pressure balancing path; and
bearing casings which are detachably coupled to the screw casing via the respective seal casings, and define the bearing chambers.

12. The oil-cooled screw compressor according to claim 10, wherein
the first seal unit includes a first labyrinth seal having a first non-contact seal structure, and
the second seal unit includes a second labyrinth seal having a second non-contact seal structure and a contact seal portion that are arranged in this order from the separation gas supply gap to the bearing chamber.

13. The oil-cooled screw compressor according to claim 10, wherein
the first seal unit includes a first labyrinth seal having a first non-contact seal structure,
the second seal unit includes a second labyrinth seal having a second non-contact seal structure, a first lip seal portion having a first contact seal structure, and a second lip seal portion having a second contact seal structure that are arranged in this order from the separation gas supply gap to the bearing chamber,
the first lip seal portion restricts a flow of a fluid in a direction from the screw chamber to the bearing chambers, and
the second lip seal portion restricts a flow of a fluid in a direction from the bearing chambers to the screw chamber.

* * * * *